United States Patent [19]
Walters

[11] Patent Number: 5,503,530
[45] Date of Patent: Apr. 2, 1996

[54] WALTER'S WHIRL-WIND VERTICAL AXIS WIND TURBINE

[76] Inventor: Victor R. Walters, P.O. Box 250, Sechelt, B.C., Canada, V0N 3A0

[21] Appl. No.: 156,701

[22] Filed: Nov. 24, 1993

[51] Int. Cl.⁶ ............................................. F03D 3/04
[52] U.S. Cl. ........................ 416/197 A; 416/DIG. 4; 415/907
[58] Field of Search ........................ 415/2.1, 4.1, 4.2, 415/4.4, 907; 416/197 A, DIG. 4

[56] References Cited

U.S. PATENT DOCUMENTS

| | | | |
|---|---|---|---|
| 840,208 | 1/1907 | Hartong | 416/197 A |
| 1,082,883 | 12/1913 | Lefler | 416/197 A |
| 2,812,823 | 11/1957 | De Oviedo | 415/129 |

FOREIGN PATENT DOCUMENTS

| | | | |
|---|---|---|---|
| 145115 | 2/1952 | Australia | 415/4.2 |
| 167694 | 1/1986 | European Pat. Off. | 415/2.1 |
| 2448049 | 8/1980 | France | 415/2.1 |
| 2835927 | 2/1980 | Germany | 415/2.1 |
| 3631709 | 3/1988 | Germany | 415/4.2 |
| 178564 | 8/1986 | Japan | 415/2.1 |
| 7712530 | 5/1979 | Netherlands | 415/2.1 |
| 1211448 | 2/1986 | U.S.S.R. | 415/2.1 |
| 667587 | 3/1952 | United Kingdom | 415/4.1 |

Primary Examiner—F. Daniel Lopez
Assistant Examiner—James A. Larson

[57] ABSTRACT

A vertical axis wind turbine is supported by a frame held in place by an encircling series of crescent-shaped tubular deflector vanes. The vanes widen towards the turbine core, concentrating the wind.

6 Claims, 2 Drawing Sheets

WALTER'S WHIRL-WIND VERTICAL AXIS WIND TURBINE

FIELD OF THE INVENTION

This invention relates to wind turbines of the type wherein a vertical shaft is turned by the wind. More particularly, it relates to an improved method of construction of such a wind turbine.

BACKGROUND TO THE INVENTION

Vertical axis wind turbines have an ancient history going back to Persian windmills of the first millennium. By the end of the nineteenth century and early 20th century numerous designs were conceived for vertical axis windmills that incorporate a series of exterior vanes to deflect the wind entering the turbine and enhance its performance.

Prior art patents of this type include:

Cleland U.S. Pat. No. 204,481
Bouteiller U.S. Pat. No. 343,000
Evison U.S. Pat. No. 591,962
Hensel U.S. Pat. No. 683,935
Bey U.S. Pat. No. 964,374
Liston U.S. Pat. No. 1,015,695
Sterner U.S. Pat. No. 1,144,737
Cain U.S. Pat. No. 1,127,400
Adams U.S. Pat. No. 1,441,774
Webb U.S. Pat. No. 1,619,643

Generally, these patents address such features as speed-control governors. The turbine buckets or troughs that serve as impellers are either open or closed, according to whether the wind may flow past such buckets into the interior region of the turbine, around its vertical axis. The exterior vanes in these references are angled to direct wind more nearly perpendicularly into the receiving face of the rotating buckets, and to shield the returning impellers from exposure to the wind. As depicted in the references, these deflecting exterior vanes are all formed of single sheets of curved metal or the like.

Further more recent patents include the following:

Carter U.S. Pat. No. 3,793,530
Mogoveny et al U.S. Pat. No. 3,938,907
Sellman U.S. Pat. No. 4,017,204
Bartsch U.S. Pat. No. 4,725,194
DeMenezes U.S. Pat. No. 4,872,804

Of these references, several show "funnelling" features leading up to the turbine inlets to concentrate and speed-up the wind as it enters the turbine impellers. As well, the exterior vanes mentioned previously intrinsically serve to concentrate the wind as they extend between outer and inner cylindrical openings and close together in a normal, radial-like manner.

Generally, the vertical series of known wind-receiving impellers and the outer encircling array of deflector vanes are held in place by respective pairs of end plates to which the ends of these components are fastened. The axis of the turbine itself is generally fitted into the upper plate which caps the deflector vanes and frames the turbine. As the force of the wind will develop a substantial toppling torque on the entire turbine structure, it is important that this outer frame formed by the deflector vanes and their end plates will constitute a rigid and stable structure.

This is all the more so true because the preferred aspect ratio for a vertical wind turbine will provide for a height that is greater than its width (providing for more wind-receiving surfaces in an elevated position). Thus, the stabilization of the outer deflector frame is akin to the problem of supporting a relatively small roof with an encircling series of relatively lengthy columns and providing strength to resist lateral wind forces.

The present invention provides an improvement in this structural support aspect of vertical axis wind turbines. As a further feature, this invention improves the performance of such turbines by increasing the concentration effect of air entering the turbine. Additionally, the air entering the turbine buckets or troughs is contained momentarily in a manner which further contributes to the performance of the turbine. Lastly, an improved method of extracting the rotary power is provided. These and other features of the invention will become apparent from its description.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the invention in its broader aspect, a vertical axis turbine having a turbine rotor with vertical impeller surfaces is provided with a surrounding circumferential series of vertically deployed deflector vanes, each of which is tubular (in the most general geometric sense) in shape, widening from an edge at its outer circumferential boundary to form a triangular-like cross-section. This cross-section terminates with a base located at the inner circumferential boundary of the series of vanes, positioned next to the outer circumferential path of the turbine. This triangular-like cross-section is preferentially curved in a semi-crescent form to both further concentrate air entering the turbine (beyond the concentration arising from the radial closing of the deflector vane's active surface) and deflect the air flow to direct it against the active surfaces of the turbine impellers at a more nearly perpendicular orientation.

In a preferred configuration the tubular deflector vanes are closed on their inner, base sides, facing the turbine, whereby air received by the turbine impellers is contained momentarily by such closed, inner base sides as the turbine rotates past each tubular deflector vane. This feature is particularly preferred where the receiving surfaces of the impellers of the turbine are formed within troughs or buckets that are closed on their inner, axially-directed edges to provide impeller cavities.

As an optional feature of the invention, the turbine rotor itself may be formed by a series of tubular elements contained between upper and lower turbine end plates, such tubular elements also having a triangular-like or semi-crescent shaped cross-section that is not necessarily the same as that of the deflectors.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
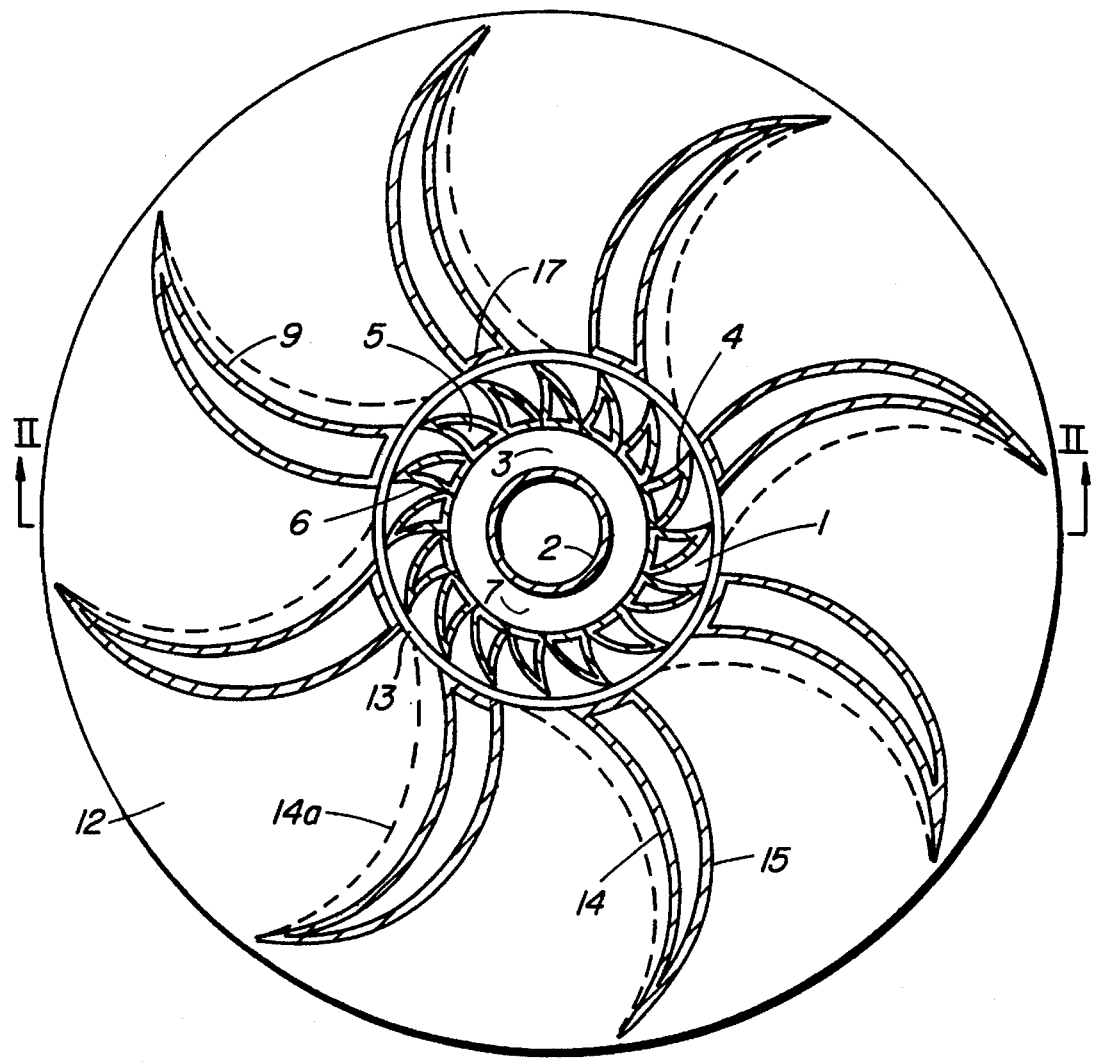
FIG. 1 is a cross-sectional plan view of a turbine according to the invention.

In FIG. 1 an inner turbine rotor 1 has a vertical axle 2 in the form of a pipe fixed at its lower end to center of the turbine lower end plate 3. A series of turbine impellers 4 are formed from tubular sheet metal cylinders 5 of a generally triangular or three-sided cross-section. Although shown as being contiguous in FIG. 2 (so as to close-off the active surfaces 6 from the interior axial volume 7 of the turbine and form impeller cavities) the impeller cylinders 5 may be spaced to permit air to enter the interior volume 7.

By forming the impeller cylinder 5 as a closed tube, a series of box-beam-like elements of corresponding strength are created. These may be fastened to the lower and upper turbine end plates 3, 3a as by welding or bolting. This permits the turbine rotor 1 to be readily assembled into a strong, rigid structure.

Figure 2:
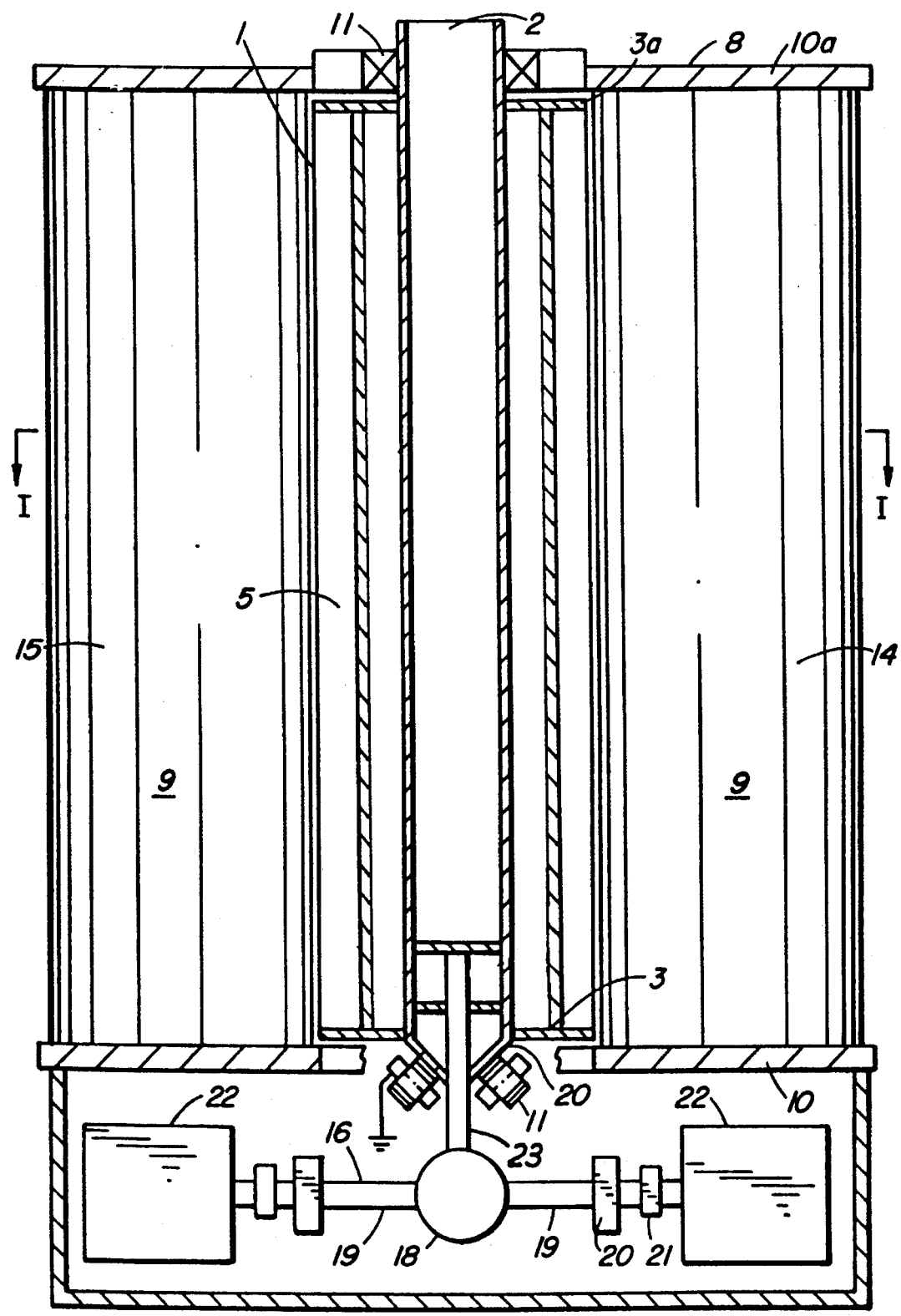
FIG. 2 is a profile view of the turbine of FIG. 1.

As shown in FIG. 2, the turbine 1 is held in place by an external frame 8 formed of a series of tubular deflector cylinders 9 fastened between lower and upper deflector end plates 10, 10a. The axle 2 of the turbine 1 is centrally mounted so as to be contained within the deflector end plates 10, 10a by low friction bearings 11 that bear against a conical bearing surface end plate 20.

The deflector tubes 9 have a generally triangular-like cross-section, with a shape similar to a semi-crescent.

This, as with the impeller cylinders 5, forms a box-beam-like element that provides great structural integrity and stability for the frame 8. This allows the turbine 1 to be free-standing and self-supporting.

The deflector tubes 9 provide a series of radial openings 12 that are tapered inwardly as proceeding to the deflector exit throat 13. This taper narrows the cross-sectional area for air entering the turbine rotor 1, forcing the air to increase its velocity. This feature is particularly important since the power available from the wind rises with the cube of wind velocity. Because of the reducing separation that develops between the forward faces 14 of each of the defectors and the rearward 15 faces of the next adjacent deflector tubes 9 as approaching the exit throat 13, a greater degree of narrowing of the air flow passageway is established. Depicted are a narrowing ratio between the entry opening 12 and the exit throat 13 between the respective deflector tubings 9 of around 5 to 1 in solid outline of the deflectors 15, and around 11 to 1 for the alternate dotted outline for surface 14a.

The deflector tubing 9 is preferably formed with a curve within the forward face 15 that will direct air through the exit throat 13 in a direction that is approximately perpendicular to the active wind-receiving surface 6 on the turbine impellers 4. It is also predicted that the use of a closed base panel 17 on the deflector tubing 9 will enhance performance and reduce vibration by trapping air in the turbine impeller cavities. However, this panel may be partially opened to relieve over pressure within the impeller cylinders 5 without departing substantially from the stability inherent in deflector cylinders 9.

To remove rotary power from the turbine rotor 1, an automobile differential 16 is shown. The drive shaft 23 is coupled to the turbine shaft 2 and enters the differential gear box 18. The split axle drive shafts 19 carry power through brakes 20 and wheel-plate couplers 21 to electrical generators 22. Through use of differential gearing and dual generators the speed of one generator can be held fixed while surges in the speed of the turbine can be absorbed in the second generator 22.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The Embodiments of the Invention in Which an Exclusive Property is Claimed as Follows:

1. A vertical axis wind turbine having a turbine rotor comprising upper and lower, horizontal turbine rotor end plates which are generally circular, a central axle, and a series of closed, tubular rotor impellers contained between the upper and lower turbine rotor end plates, each of such tubular rotor impellets having:

(1) upper and lower ends, a three-sided shaped cross-section and a wind-receiving surface;

and each of said tubular rotor impellers being:

(2) mounted proximate to two adjacent tubular rotor impellers;

(3) attached at their upper and lower ends to the circular periphery of the respective upper and lower turbine rotor end plates; and (4) positioned to permit the wind-receiving surface of each tubular rotor impeller to receive wind directed against such surfaces substantially tangentially with respect to the direction of rotation of the turbine at the outer periphery of said rotor impellers.

2. A wind turbine as in claim 1 further comprising a surrounding series of vertically deployed deflector vanes mounted about the circumferential boundary of the turbine rotor, said vanes being positioned and contained between upper and lower end vane support plates that also support the turbine axle, each of said deflector vanes being tubular in shape, widening from an outer vane edge at the outer boundary of each vane to a vane base located proximate to the circumferential boundary of the turbine rotor, whereby support for the turbine rotor is provided through the upper and lower vane support plates and surrounding deflector vanes.

3. A wind turbine as in claim 2 wherein the cross-sectional shape of the deflector vanes is curved in a semi-crescent form, widening towards said base, to both concentrate air entering the turbine rotor beyond the concentration that would arise from vanes of constant thickness and deflect air flow entering therein to direct such air against the wind receiving impeller surfaces of the tubular rotor impellers at substantially a perpendicular angle of incidence.

4. A wind turbine as in claim 3 wherein the tubular rotor impellers have one outer and two inner edges and are contiguously mounted with such inner edges in consecutive contact to prevent air from entering centrally within the rotor.

5. A wind turbine as in claim 4 wherein the deflector vanes are closed on their inner, vane base sides, facing the turbine rotor whereby air received by the wind-receiving impeller surfaces is contained momentarily by such closed, inner vane bases as the tubular rotor impellers rotate past each tubular deflector vane.

6. A turbine as in claims 2, 3 or 5 wherein the deflector vanes are of such a thickness at their base ends as to effect a concentration of the air entering the turbine rotor with respect to the air entering the deflector vanes of between 5 to 1 and 11 to 1.

* * * * *